May 2, 1967 P. M. LARRABURU ET AL 3,317,739
MICROSCOPE WITH PHOTOELECTRIC SCANNER
FOR ACCURATELY DETERMINING
THE POSITION OF A LINE

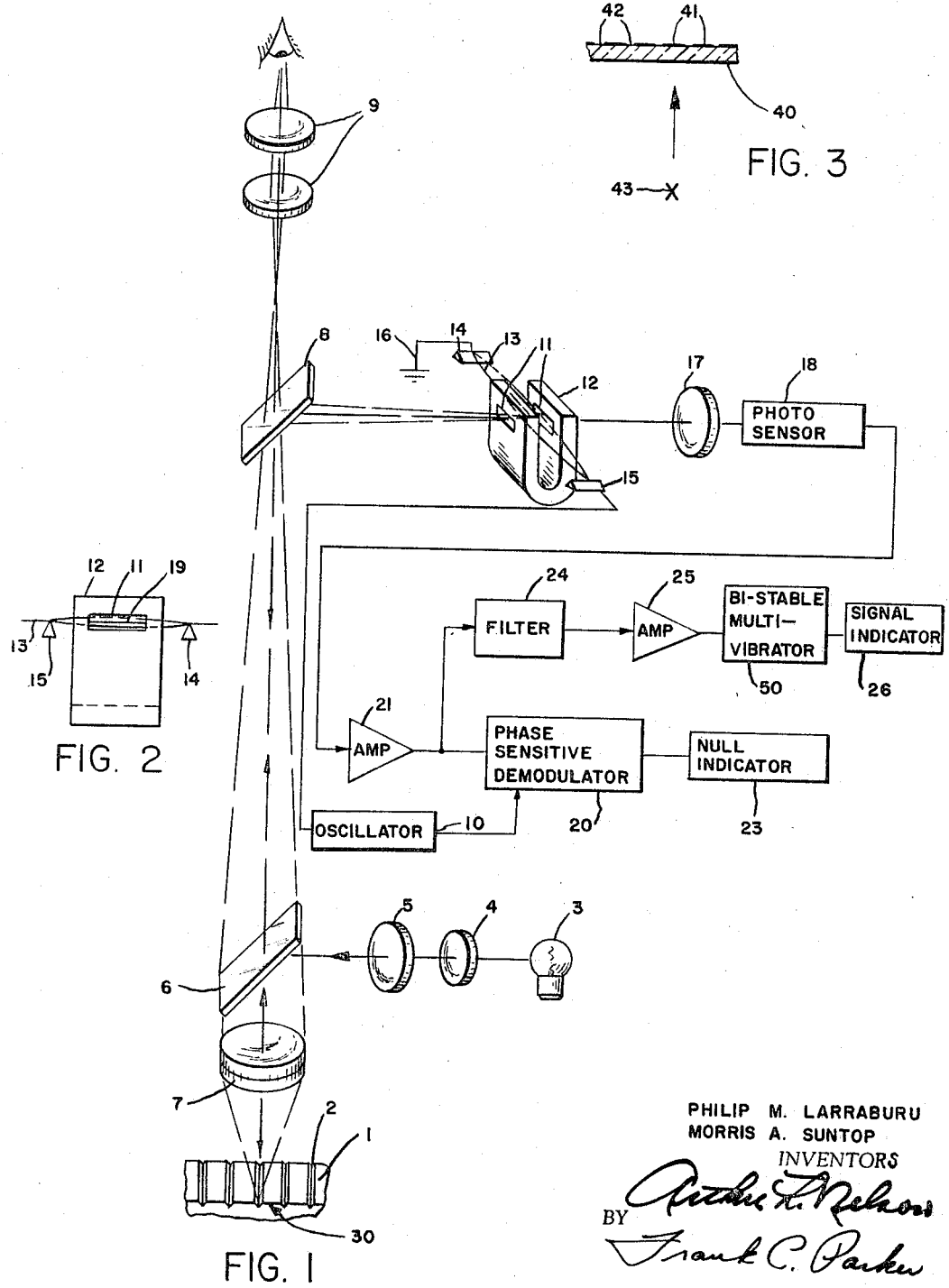

Filed Oct. 21, 1964 2 Sheets-Sheet 2

PHILIP M. LARRABURU
MORRIS A. SUNTOP
INVENTORS

BY *Arthur L. Nelson*
*Frank C. Parker*

ATTORNEYS

United States Patent Office 3,317,739
Patented May 2, 1967

3,317,739
MICROSCOPE WITH PHOTOELECTRIC SCANNER FOR ACCURATELY DETERMINING THE POSITION OF A LINE
Philip M. Larraburu, Sherman Oaks, Calif., and Morris A. Suntop, Brighton, N.Y., assignors to Bausch & Lomb Incorporated, Rochester, N.Y., a corporation of New York
Filed Oct. 21, 1964, Ser. No. 405,467
10 Claims. (Cl. 250—232)

This invention relates to a photoelectric microscope and more particularly to a photosensing means of precisely indicating the location of an accurately ruled scale line.

The photoelectric microscope was developed to increase accuracy of measurements, to eliminate the personal error of the observer and the visual drift due to fatigue, and provide an accurate remote readout system. Various scanning devices have been used in photoelectric microscopes to scan a scale line and optically produce a light signal which is detected by a photosensor. These various scanning devices have inherent limitations due to inertia of the scanning element, inaccuracy in the rate of scanning caused by vibration, heat dissipation, and others. Accordingly the present invention is intended to provide a vibrating wire as a scanning device which scans the image plane of the scale line in front of a photodetector which generates an electrical signal, to determine the precise location of the scale line relative to a microscope axis.

It is an object of this invention to provide a photoelectric microscope having a photosensing means for precisely locating an accurately ruled scale line.

It is another object of this invention to provide a photoelectric means based on the use of a single photosensor for use in a microscope for indicating the precise location of a scale line with respect to the optical axis.

It is a further object of this invention to photoelectrically sense the precise location of a scale line which is imaged on a vibrating wire located in front of a photodetector.

The objects of this invention are accomplished by providing a microscope optical system for focusing on ruled scale lines. The visual portion of the microscope is primarily used as a fiduciary means. A source of illumination projects light into the optical system for vertical illumination of the scale surface in one of the embodiments of the invention. A ground glass element may be placed between the lamp and the optical system to provide uniform illumination of the scale surface. The means used for illuminating the scale is not critical, but it is important that the scale surface be uniformly illuminated because non-uniform illumination will cause a spurious signal to be generated by the photodetector.

The image of the scale line is focused in the plane of vibration of a vibrating wire which is caused to vibrate by electromagnetic means. The position of a scale line image relative to the vibrating wire is sensed by a photodetector which receives a light signal responsive to illumination passing through the plane of the vibrating wire. An electrical signal is generated by the photodetector which is applied to a phase-sensitive demodulator which senses the phase of the electrical signal generated by the photodetector relative to the phase of the reference voltage which excites the wire to vibration. A microamp meter which can be calibrated to read the precise location of the scale line image relative to the neutral position of the vibrating wire receives a signal from the phase-sensitive demodulator. A null reading on the meter indicates that condition where the optical center-line of the scale line image is precisely superposed on the neutral axis of the vibrating wire, independent of the level of illumination, amplifier gain, or detector sensitivity.

The preferred embodiments of this invention will be described in the following paragraphs and are illustrated in the attached drawings.

FIG. 1 illustrates the optical system and the electrical diagram for sensing the location of the scale line.

FIG. 2 is a view of the vibrating wire relative to the image of the scale line.

FIG. 3 is a modification of the scale using back lighting to produce bright scale lines on a dark background.

Figure 4:
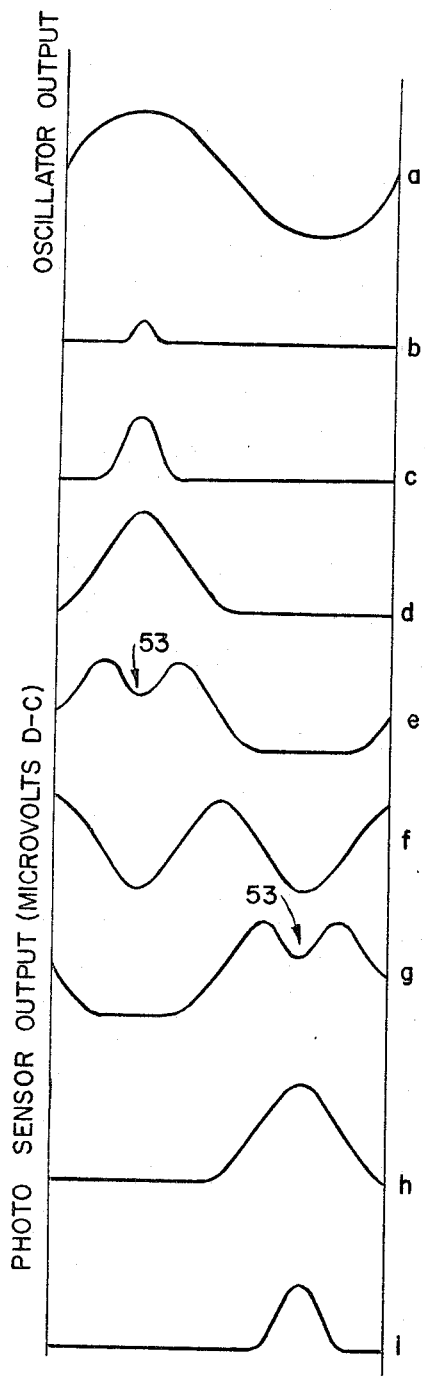
FIG. 4 illustrates wave forms of the oscillator signal and signals generated by the photodetector.

Referring to FIG. 1 the illuminating means 3 illuminates a ground glass disk 4 which is imaged on a scale surface and the plurality of scale lines 2 formed on the surface thereof. The surface 1 reflects light back into the optical system. Each of the scale lines, however, effectively scatters the incident light so that it does not re-enter the optical system, thereby indicating a dark line against a bright field as viewed optically, or as sensed by the photosensor means. The partially reflecting beam divider 6 reflects the light downwardly through the objective lens assembly 7. The light is focused on scale surface 1 and the scale line 2 and the light that strikes surface 1 is reflected back into the optical system. The light passes through the beam divider 6 and is directed onto the beam divider 8. A portion of the reflected beam passes through the pupil lens 9 and may be visually observed by the eye. The visual portion of the optical system is primarily used for focusing and alignment of the scale, and as a fiducial indicator. A portion of the reflected beam is reflected by the beam divider 8 through the slit apertures 11 in the pole-pieces of permanent horseshoe magnet 12. The beam of light directed through the slit apertures 11 is focused in the plane of the vibrating wire 13, intermediate to the ends of the permanent horseshoe magnet 12.

An electromagnetic means is used to vibrate the wire. The vibrating wire 13 is taut between the supports 14 and 15. An oscillator 10 generates an alternating current which is caused to pass through the wire to ground 16. The movement of current through the wire in the constant magnetic field causes the wire to vibrate in a plane normal to the lines of magnetic force, and hence to the axis of the light beam directed through the slit apertures 11 in the ends of the magnet 12. A direct current in a wire placed in an alternating electromagnetic field would also work satisfactorily. The wire 13 vibrates across a portion of the slit apertures 11 as indicated in FIG. 2, partially obstructing passage of light through the slits. The lens 17 may be employed to focus the beam of light on the photosensor 18 which generates an electrical signal in response to the amount of light passing through the slit apertures 11. An image of the scale line 2 is focused in the plane of the vibrating wire and passes laterally across the focal plane relative to the slit apertures 11 as the scale is moved across the objective focal plane of the microscope. The scale line width and wire diameter are approximately equal. The movement of the scale line through the plane of the vibrating wire varies the intensity of light falling on the photosensor which varies the magnitude of the signal generated by the photosensor 18.

Referring to FIG. 2 the permanent magnet 12 is illustrated with the slit aperture 11 in the one pole of the magnet. Slit apertures are formed in the ends of the magnet although any opening which forms an aperture in the optic system, without causing drastic disturbance or diminution of the magnetic field, is sufficient. The slit-shaped aperture limits the light level to the photosensor and reduces the noise level in the photosensor output signal. A small aperture provides a more uniform magnetic field intermediate the ends of the magnet. The image 19 of the line 2 is illustrated centrally in the slit apertures 11. The wire 13 is shown vibrating across the central portion of the slit apertures 11 in response to applying an alternating current to the wire.

The oscillator signal is applied to the wire 13 to cause vibration of the wire in the magnetic field as well as being applied to the phase-sensitive demodulator 20. The frequency of the oscillator 10 may have any suitable value within the frequency response range of the detector, provided it is a mechanically feasible vibration frequency of the wire. The frequency of the oscillator signal applied to the wire must differ significantly from the mechanical resonant frequency of the wire, in order that the displacement of the wire from its neutral position be in phase with the exciting current, and that the amplitude of vibration be less sensitive to small variations in oscillator current.

The photosensor 18 generates a signal of changing magnitude responsive to the light received on the photosensor. The signal from the photosensor 18 is applied to the amplifier 21 which amplifies the signal and applies the amplified signal to the phase-sensitive demodulator 20. The phase-sensitive demodulator compares the amplified photosensor signal with the reference signal from the oscillator. The output of the demodulator 20 is filtered and applied to the null indicator 23 which indicates a null reading when the scale line image is coincident with the neutral position of the wire, thus establishing that the scale line 2 is centered on the axis of the optical system of the photoelectric microscope. The null indicator also gives a null reading when no scale line is visible in the microscope field; accordingly a signal indicator is also used in the readout circuit. The operation of the phase-sensitive demodulator 20 will be more specifically described in subsequent paragraphs.

As mentioned above the null indicator 23 will indicate a null reading when no scale line is visible in the optical field of the microscope. Accordingly a signal indicator 26 is provided to indicate the presence of a scale line in the microscope field. This is possible because of the fact that when an image of the scale line is coincident with the neutral position of the vibrating wire there is a doubling of the frequency of photodetector output signal. The doubled frequency is amplified by the amplifier 21 and applied to the filter 24 as well as the phase-sensitive demodulator 20. The filter 24 passes the second harmonic of the fundamental oscillator frequency to a bistable multivibrator 50. When a signal of a predetermined amplitude is applied to the bistable multivibrator 50 a voltage is generated by the multivibrator 50 which passes an energizing voltage for operating the signal indicator 26 which may be a bulb. In this manner, when a scale line is present under the photoelectric microscope which causes an image to be formed in the vicinity of the neutral position of the vibrating wire the null indicator gives a null reading or near null reading and the signal indicator recognizes the presence of the scale line on or near the optical axis.

The operation of the device will be described in the following paragraphs. The scale 30 includes a plurality of ruled scale lines 2 on its surface. The microscope is focused on the surface 2 of the scale. The illuminating means 3 projects light on the ground glass disk 4 for uniform illumination. The illuminated disk projects light through the condenser lens 5 onto the beam divider 6. The light then passes through the objective lens assembly 7 and is focused on a surface of the scale 1. This provides a vertical illumination of the scale surface and uniformly illuminates all portions of the scale surface in the microscope field.

The scale surface reflects light through the optical system and a dark line image is indicated by the scale line. The light reflected back through the optical system is divided by the beam divider 8 and a portion of the light provides an image for visual observation while the remaining portion of the reflected light beam is focused in the plane of the vibrating wire 13. The vibrating wire 13 is caused to vibrate in the permanent magnetic field of the magnet in a plane normal to the optical axis of the beam of light passing through the plane. The frequency of vibration of the wire is determined by the oscillator 10 which also generates a reference signal which is applied to the phase-sensitive demodulator 20. For the purpose of illustration FIG. 4 illustrates wave forms of which FIG. 4a indicates a sine wave generated by the oscillator and applied to the vibrating wire. When no scale line is present in the microscope field no scale line image is projected in the plane of the vibrating wire and the signal output from the photodetector 18 is constant at some D.C. level.

Figure 6:
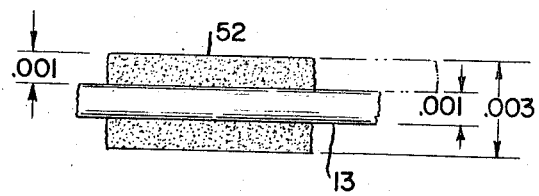
FIG. 6 is an enlarged view of portions of the scale line image and wire.

For the purpose of illustration only FIG. 6 shows the relative proportions of the wire diameter and the width of the image of the scale line and an amplitude of vibration of the wire within the limits of .003″. The wire diameter is .001″ and the width of image of the scale line is .001″. These dimensions are not intended to be limiting but merely illustrative.

Referring to FIG. 4b the wave form illustrated shows the signal generated by the photodetector 18 when the scale line image 52 is just entering the extreme limits of the sweep of the wire 13. FIG. 4c illustrates the wave form generated by the photodetector as the scale line is moved closer to the neutral position of the vibrating wire which causes a greater overlap of the image of the scale line and the wire as the wire is deflected to one side from its neutral position. The wave form of increased amplitude is generated because a portion of the wire which previously blocked light from the photodetector now overlaps a portion of the image of the scale line which appears to the detector as a dark area. The overall effect of the overlap of the image of the scale line and the vibrating wire is to allow more light to fall on the detector with a resultant increase in signal amplitude.

When the scale line image 52 moves closer to the neutral position of the vibrating wire a point is reached at which the image of the scale line is wholly within the sweep of the vibrating wire. This point is illustrated in FIG. 4d. Any further movement of the image of the scale line causes a dip 53 as the wire sweeps beyond the image of the scale line. This dip, illustrated in FIG. 4e, becomes more pronounced as the image of the scale line moves further toward the neutral position of the wire. The neutral position is shown in FIG. 4f where the second harmonic of the fundamental or oscillator frequency is shown. The doubling of the fundamental frequency provides a means of indicating when the image of the scale line is coincident with the neutral position of the vibrating wire. FIGS. 4g, 4h and 4i illustrate the wave form as the image of the scale line passes the neutral position of the vibrating wire and moves beyond the other extreme position of the vibrating wire. The wave forms are identical in shape but are shifted in time by one-half the period of the oscillator reference signal, as compared with the wave forms illustrated in the previous views.

Figure 5:
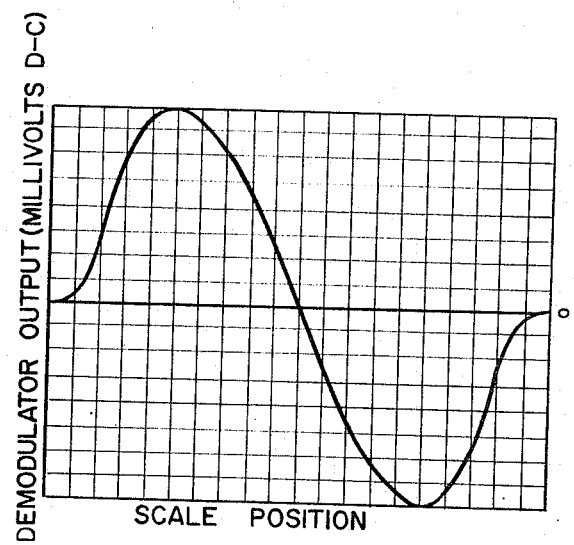
FIG. 5 illustrates the demodulator output which is applied to the meter as a function of the position of the scale line image relative to the neutral position of the vibrating wire.

The wave forms as illustrated provide a means of measuring the position of the image of the scale line relative to the vibrating wire. These signals are amplified in the amplifier 21 and are simultaneously applied to the filter 24 and the phase sensitive demodulator 20. The phase sensitive demodulator compares the reference signal from the oscillator 10 to the amplified photosensor signal from amplifier 21. The reading on the null indicator 23 which may be a direct-current voltmeter is generally illustrated in FIG. 5 as the scale line image enters the sweep of the vibrating wire. The sign of the demodulator output is positive initially because the detector signal is in phase with the oscillator reference signal, and its magnitude increases as long as the amplitude of the fundamental frequency component of the detector signal increases, as illustrated in FIGS. 4b, 4c and 4d. The amplitude decreases when the double-frequency component comes into play, as illustrated in FIG. 4e. The resulting drop in amplitude of the fundamental frequency component causes a decrease in the demodulator output which is substantially linear near the midpoint of the curve illustrated in FIG. 5. Because of the linearity of the curve in this portion the instrument can readily be calibrated to allow an accurate determination of the position of the optical center of the scale line relative to the optical pointing axis of the microscope. A zero reading or null indication is present on the null indicator 23 when the image of the scale line is superposed on the neutral position of the vibrating wire. This creates a signal whose frequency is essentially a pure second harmonic of the fundamental as illustrated in FIG. 4f. As the image of the scale line moves beyond this point the fundamental frequency components reappears, but with phase opposite that of the reference signal. As a consequence, the polarity of the demodulator output as registered on the null indicator 23 changes to a negative magnitude and increases in a manner as illustrated., Although the wave forms as illustrated in FIG. 4 show pulsating D.C., to a certain extent the wave forms actually produced are more similar to a sine wave than illustrated. The illustrations are primarily to indicate a wave form and how it changes from the fundamental to a second harmonic to provide an accurate photoelectric means of determining scale line position.

As previously indicated a null reading of the null indicator 23 is present when no scale line is in the field of the microscope. Accordingly it is necessary to indicate when a scale line is present in the field and that the null indication indicates the positioning of a scale line on the optical axis of the microscope. This is accomplished by providing a filter 24 which passes the second harmonic frequency to the amplifier 25. The signal passing through the amplifier 25 will trigger the bistable multivibrator 50 to pass an energizing voltage to a bulb or any signal indicator 26.

A modification of the photoelectric microscope utilizes bright scale lines and dark spaces intermediate the scale lines as illustrated in FIG. 3. This may be achieved in a number of ways however, the illustration in FIG. 3 provides a substrate 40 carrying opaque spacings 41 between which are formed illuminated scale lines 42. The back lighting of the source of illumination 43 projects light into the optical system which is focused in the plane of the vibrating wire. The wave form output of such a scale and illuminating means is substantially the same as illustrated in FIG. 4 however, the polarity of the Y axis is reversed which causes a decrease in the magnitude of light projected through the plane of the vibrating wire as the wire covers a portion of the illuminated image of the scale line. With a reverse polarity signal the electrical readout system will read substantially the same in that it can determine when the scale line is passing through the area of the sweep covered by the viewing wire.

The preferred embodiments of this invention have been illustrated and described and it is understood that other modifications might be devised which would fall within the scope of this invention which is defined by the attached claims.

What is claimed is:

1. A photoelectric microscope for locating the center of a line on a scale at a reference position comprising, a scale having graduation lines spaced on a surface thereof, illuminating means for illuminating the surface of said scale, an optical system for viewing a line on said scale, a beam divider for dividing the beam of reflected light from said scale and focusing a portion of the beam of light to form an image of a portion of said scale on a focal plane, means for oscillating a wire stationarily secured at both ends approximately in said focal plane about a neutral position having a predetermined positional relation with respect to said reference position, a photosensor means sensing the magnitude of luminous flux projected through said focal plane and generating an electrical signal responsive thereto, an electrical readout system generating an indication when the image of the line on said scale is symmetrically positioned about said neutral position thereby establishing the precise location of the center of said line on said scale at said reference position.

2. A photoelectric microscope for locating the center of a line on a scale at a reference position comprising means for receiving, a scale having a plurality of graduated lines, means illuminating the scale surface and the graduated lines, an optical system for viewing a graduated line on said scale, means focusing an image of a line on said scale in a focal plane, means producing a magnetic field through said focal plane, means producing a magnetic field through said focal plane, means applying an alternating current to a wire to cause vibration of said wire approximately in said focal plane about a neutral position having a predetermined positional relation with respect to said reference position, a photosensor sensing the the magnitude of luminous flux passing through the local plane and generating an electrical signal responsive thereto, a phase sensitive demodulator receiving a signal from said means applying an alternating current signal and from said photosensor thereby providing a signal null when the image of a line is precisely centered about said neutral position and a readout indicator coupled to said demodulator responsive to said signal null for indicating when the image of said line in said focal plane is precisely centered about said neutral position thereby accurately locating the center of said line on said scale at said reference position.

3. A photoelectric microscope for accurately determining when the center of a line on a scale is located at a reference position comprising, comprising, a scale having graduated lines formed thereon, means illuminating the surface of said scale, an optical system focusing on said scale and producing an image of said line in a focal plane, electromagnetic means vibrating a wire stationarily secured at both ends for substantially equal displacements about a reference lines, said reference line having a predetermined positional relation with said reference position and being disposed substantially parallel to the image of said line in said focal plane, photosensor means generating a signal responsive to the magnitude of luminous flux received through said focal plane, an electrical readout system receiving a signal from said photosensor and generating a signal null to indicate when the image of the line on said scale is symmetrically disposed about the reference line of said vibrating wire to thereby establish precisely the location of the center of a line on said scale at said reference position.

4. A photoelectric microscope for positioning the center of a line on a scale at a reference position comprising, means for receiving a scale having graduated lines in spaced relation on the surface of said scale so that said scale is movable with respect to said reference position, illuminating means for illuminating the surface of said scale, an optical system viewing a line on the surface of said scale and focusing an image of said line in a focal plane, a magnet producing a magnetic field passing through said focal plane, a vibrating wire secured at opposite ends passing through said magnetic field and vibrating in response to an alternating current reference signal applied to said wire in substantially equal displacements about a reference line having a pre-determined positional relation with said reference position, a photosensor sensing the magnitude of luminous flux passing through said focal plane and generating an electrical signal responsive thereto, an amplifier for amplifying the signal from said photosensor, a phase sensitive demodulator receiving the photosensor signal from said amplifier and comparing said signal to the reference signal and producing an output signal null to indicate when the image of the scale line is centrally disposed with respect to the reference line of said vibrating wire to thereby accurately indicate when the center of a scale line is accurately positioned at said reference position.

5. A photoelectric microscope for accurately aligning the center of a line on a scale surface with reference to the microscope axis comprising, a scale including a surface having graduated scale lines thereon, illuminating means uniformly illuminating at least a portion of the scale surface, an optical system imaging the scale surface on an imaging plane, means for scanning a portion of the image plane with a wire vibrating about a reference line disposed in substantially parallel relation to a line of said image of said scale and in fixed relation to said microscope axis, said wire being stationarily secured at both ends, a photodetector receiving an image responsive to light transmitted through said image plane and generating a signal of a varying amplitude and phase responsive to the scale line position relative to said reference line so that a signal twice the scanning period of said wire is generated when said image of a line is symmetrically aligned about said reference line, a phase sensing means receiving said signal from said photodetector means and comparing said signal with a reference signal indicating when the image of the scale line is symmetrically disposed about said reference line thereby accurately aligning the center of said scale line at said reference position.

6. A photoelectric microscope for determining the location of the center of a line on a scale surface with reference to a microscope axis comprising, a scale including a surface having graduated scale lines, illuminating means uniformly illuminating the surface of said scale, an optical system imaging the scale surface in an image plane, a scanning means including a vibrating wire stationarily secured at both ends in said image plane, electromagnetic means inducing vibration of said wire in the image plane so that said wire vibrates about a neutral position that is substantially parallel to the lines on the scale surface imaged in said image plane, said reference line having a pre-determined positional relation to said microscope axis, photodetector means detecting light transmitted through said image plane and generating an electrical signal responsive thereto, a phase sensitive demodulator receiving a reference signal from said electromagnetic means and a signal from said photodetector means and sensing the phase relationship of said signals determining when a line of the image of said scale line is symmetrically disposed about the neutral position of said vibrating wire thereby accurately locating the center of a line on said scale with reference to said microscope axis.

7. A photoelectric microscope for determining the location of the center of a line on a scale surface with reference to the microscope axis comprising, a scale including a surface having graduated scale lines thereon, illuminating means uniformly illuminating the surface of said scale, an optical system imaging the scale surface in an image plane, a scanning means including a vibrating wire disposed in said image plane, a magnet producing a magnetic field in said image plane, an oscillator generating a fundamental oscillator frequency signal and applying the signal to said wire to induce said wire to vibrate about a neutral position approximately in said image plane said neutral position having a pre-determined positional relation with respect to said microscope axis and is substantially parallel to the lines of said image scale surface, a photodetector receiving light passing through said image plane and generating a signal responsive to the light passing through said image plane, a phase sensitive detector receiving the fundamental oscillator frequency from said oscillator and receiving the signal generated by said photodetector and sensing the phase relationship of said signals to provide a null signal when a line included in said imaged scale surface is symmetrically disposed about said neutral position and, an indicator receiving an output signal from said phase sensitive detector for indicating when the image of the scale line is symmetrically disposed about the neutral position of said vibrating wire thereby accurately locating the center of a line on said scale with reference to said microscope axis.

8. A photoelectric microscope for determining the location of the center of a line on the scale surface with reference to the microscope axis comprising, a scale including a surface having graduated scale lines thereon, illuminating means uniformly illuminating the surface of said scale, an optical system imaging at least a portion of the surface of said scale in an image plane, a magnet producing a magnetic field passing through the image plane, a wire fastened at both ends to extend approximately in said image plane, an oscillator generating a fundamental oscillator frequency applied to said wire and inducing said wire to vibrate in said magnetic field along said image plane about a reference line that is substantially parallel to the lines of said imaged scale surface, said reference line having a predetermined positional relation with respect to said microscope axis, a photodetector means receiving light passing through said image plane and generating a signal responsive to light reflected on the imaged portion of the scale surface and light unobstructed by said vibrating wire, a phase sensitive means receiving the fundamental oscillator frequency from said oscillator and the photoelectric signal from said photosensor and generating an output responsive to the phase relationship of said two signals to produce a null signal when a line of said imaged scale surface is symmetrically disposed about said reference line and a signal proportional to the distance and the direction between the center of a line of said imaged scale surface and said reference line when said image of a line is not symmetrically disposed about said reference line, a null indicator indicating the phase relationship of said two signals and thereby indicating the relative position of the center of a scale line relative to the microscope axis of said photoelectric microscope.

9. A photoelectric microscope for determining the location of the center of a line on a scale surface with reference to the microscope axis comprising, a scale including a surface having graduated scale lines thereon, an illuminating means uniformly illuminating the surface of said scale, an optical system imaging the illuminated surface of said scale in an image plane, a magnet creating a magnetic field passing through said image plane, a wire fastened at both ends positioned in the image plane, an oscillator generating a fundamental oscillator frequency coupled to apply a signal to said vibrating wire and thereby causing said wire to vibrate about a neutral position transversely to light passing through said image plane, said neutral position being approximately parallel to the lines in said imaged scale surface and having a predetermined physical position with respect to said microscope axis, a photosensor receiving light passing through said image plane and generating a fundamental signal when a scale line is not coincident to said neutral position and a second harmonic when a line in said imaged scale surface is coincident to said neutral position, a phase sensitive demodulator receiving a signal from said oscillator and a signal from said photodetector and comparing said signals, a null indicator receiving a signal from said phase sensitive means and indicating a null reading when the image of the scale line is coincident with the neutral position of said vibrating wire, a filtering means receiving a signal from said photosensor and passing substantially only the second harmonic of said signal to a triggering circuit, said triggering circuit applying a voltage to a signal indicator to indicate the presence of the second harmonic frequency generated by said photosensor and thereby indicating the presence of a scale line coincident with the neutral position of a vibrating means.

10. A photoelectric microscope for determining the location of the center of a line on a scale surface with reference to the microscope axis comprising, a transparent scale line having opaque spacings intermediate transparent graduated scale lines, illuminating means projecting illumination through said transparent scale lines, an optical system receiving light through said scale lines and imaging an image of said lines in an image plane, a scanning means including a vibrating wire disposed in said image plane and stationarily secured at both ends, electromagnetic means inducing vibration of said wire about a reference line in said image plane said reference line being in a pre-determined positional relation in respect to said microscope axis and substantially parallel to the imaged lines, a photodetector means receiving light passing through said image plane and generating a signal responsive to the amount of light passing through said image plane, a phase sensitive demodulator receiving a reference signal corresponding to the period of vibration of said wire and said photodetector signal and comparing said signals, an indicator receiving an output signal from said phase sensitive demodulator to indicate the position of the center of a scale line relative to the microscope axis of said photoelectric microscope.

References Cited by the Examiner

UNITED STATES PATENTS

| 2,651,696 | 9/1953 | Thor | 88—40 |
| 2,720,810 | 10/1955 | Senn | 250—237 |
| 3,213,282 | 10/1965 | Brouwer | 250—232 |
| 3,219,828 | 11/1965 | Foster | 250—232 |

RALPH G. NILSON, *Primary Examiner.*

M. ABRAMSON, *Assistant Examiner.*